United States Patent [19]

Ogawa

[11] Patent Number: 5,428,533

[45] Date of Patent: Jun. 27, 1995

[54] SUSPENSION CONTROL SYSTEM WITH VARIABLE DAMP AND SPRING COEFFICIENTS

[75] Inventor: Kazuo Ogawa, Toyota, Japan

[73] Assignee: Toyota Jidosha Kabushiki Kaisha, Toyota, Japan

[21] Appl. No.: 25,412

[22] Filed: Mar. 1, 1993

[30] Foreign Application Priority Data

Mar. 2, 1992 [JP] Japan .................................. 4-080441

[51] Int. Cl.$^6$ .............................................. B60G 17/04
[52] U.S. Cl. ................... 364/424.05; 280/707
[58] Field of Search ....................... 280/707, 703, 708; 267/218; 364/424.05

[56] References Cited

U.S. PATENT DOCUMENTS

| | | | |
|---|---|---|---|
| 4,648,622 | 3/1987 | Wada et al. | 280/707 |
| 4,671,553 | 6/1987 | Asami et al. | 280/707 |
| 4,685,689 | 8/1987 | Takizawa et al. | 280/707 |
| 4,690,429 | 9/1987 | Asami et al. | 280/707 |
| 4,834,418 | 5/1989 | Buma et al. | 280/707 |
| 4,856,815 | 8/1989 | Tanaka et al. | 280/707 |

FOREIGN PATENT DOCUMENTS

| | | |
|---|---|---|
| 0270893 | 6/1988 | European Pat. Off. |
| 3813695 | 11/1988 | Germany |
| 4021909 | 2/1991 | Germany |
| 4116839 | 1/1992 | Germany |
| 61-163011 | 7/1986 | Japan |
| 3276806 | 12/1991 | Japan |
| 3276807 | 12/1991 | Japan |
| 3276808 | 12/1991 | Japan |
| 3276811 | 12/1991 | Japan |
| 4015113 | 1/1992 | Japan |

OTHER PUBLICATIONS

Experimental Comparison of Passive, Semi-Active On/Off, and Semi-Active Continuous Suspensions, No. 892484, Douglas E. Evers et al, Lord Corporation, pp. 1-7.
The Experimental Performance of An On-Off Active Damper, The Shock and Vibration Bulletin, vol. 51 No. 1, pp. 125-131, Jan. 1989.
Analysis of Semi-Active Suspensions by Nonlinear Feedback Control, T. Shioneri et al, Dept. of Mechanical Engineering, Tokyo University, pp. 1021-1023.
Theoretical Study on Stability of Semi-Active Suspension, T. Shioneri et al, pp. 90-94, Oct. 1988.
Semi-Active Control and Preview Control of Suspension, pp. 301-306, Japan. Patent Abstracts of Japan Vol. 16, No. 414 (M-1302) 9/92 re JP-A-4-138906.

Primary Examiner—Kevin J. Teska
Assistant Examiner—Dan Fiul
Attorney, Agent, or Firm—Cushman, Darby & Cushman

[57] ABSTRACT

In a suspension control system for a suspension supporting a mass body on a support base via a parallel combination of a spring means variable damp coefficient, absolute displacement (Z) and absolute having a variable spring coefficient and a shock absorber having a velocity ($\dot{Z}$) of the mass body along a moving path of expansion and contraction of the spring means and the shock absorber, and relative displacement (Y) and relative velocity ($\dot{Y}$) of the mass body in reference to the support base along the moving path are respectively obtained, and the damp coefficient of the shock absorber is controlled according to the ratio of the absolute velocity to the relative velocity ($\dot{Z}/\dot{Y}$) so as to be substantially proportional thereto, while the spring coefficient of the spring means is controlled according to the ratio of the absolute displacement to the relative displacement (Z/Y) so as to be substantially proportional thereto.

5 Claims, 5 Drawing Sheets

SUSPENSION CONTROL SYSTEM WITH VARIABLE DAMP AND SPRING COEFFICIENTS

BACKGROUND OF THE INVENTION

1. Field of the Invention

The present invention relates to a suspension for supporting a mass body on a support base via a parallel combination of a spring means and a shock absorber, and more particularly to a control of such a suspension with certain variations of the damp coefficient of the shock absorber and the spring coefficient of the spring means.

2. Description of the Prior Art

A suspension for supporting a mass body on a support base via a parallel combination of a spring means and a shock absorber is common in the art of automobile, wherein a mass body comprised of a vehicle body and a passenger or passengers is supported on a plurality of vehicle wheels via a plurality of suspension mechanisms each including a parallel combination of a suspension spring and a shock absorber, so that each parallel combination of the spring and the shock absorber bears a share of the total mass of the vehicle body and the passenger or passengers to support it on a corresponding vehicle wheel.

FIG. 6 illustrates schematically such a dynamic system, wherein a mass body 100 having a mass M is supported on a support base 110 via a suspension comprising a parallel combination of a spring 130 having a spring coefficient K and a shock absorber 120 having a damp coefficient C. As is well known in the art, expressing the absolute displacements of the support base 110 and the mass body 100 in reference to a certain absolute ordinate by X and Z, respectively, thereby also expressing the relative displacement of the mass body 100 in reference to the support base 110 by Y, the dynamic motion of the dynamic system is expressed as follows:

$$MZ = -C(Z - X) - K(Z - X) \quad (1)$$
$$= -CY - KY$$

In the suspension shown in FIG. 6, the spring 130 is indispensable for supporting the mass body 100 against the gravity in the dynamic state as well as in the static state of the system, whereas the shock absorber 120 operates only to dampen a dynamic movement of the mass body 110 and is ineffective in the static state of the system. In view of this, it is considered to mount the shock absorber 120 between the mass body 100 and a stationary member 140 as shown in FIG. 7, in order to more effectively dampen the dynamic movement of the mass body 100 when desired, although no such stationary member is available in the case of the suspension of automobile. A damper such as the shock absorber 120 in FIG. 7 provided above the mass body 100 to dampen the movement of the mass body 100 from the overhead stationary member 140 is called a sky hook damper. It has been proposed in Japanese Patent Laid-open Publications 3-276806, 3-276807, 3-276808, 3-276811 and 4-15113 assigned to the same assignee as the present application to analyze the system shown in FIG. 7 in the equivalency conversion to the system shown in FIG. 6, so that the damping action of the shock absorber 120 in the system shown in FIG. 6 is approximated to the shock absorber 120 in the system shown in FIG. 7, so as thereby to obtain a more stable damping effect for the mass body 100 without the stationary member 140 in the case of the automobile suspension.

In more detail, according to the conventional dynamics, the dynamic motion of the system shown in FIG. 7 is expressed by $$MZ = -C^*Z - K(Z - X) \quad (2)$$
$$= -C^*Z - KY$$

wherein $C^*$ and $K$ are the damp coefficient and the spring coefficient of the shock absorber 120 and the spring 130 in FIG. 7, respectively. Therefore, from the comparison of equations (1) and (2), if the damp coefficient $C$ of the system shown in FIG. 6 is controlled to be a multiplication of a constant damp coefficient $C^*$ in FIG. 7 and ratio $Z/Y$, i.e. the ratio of the absolute velocity of the mass body 100 to the relative velocity of the mass body 100 in reference to the support base 110, the mass body 100 in the system shown in FIG. 6 will be more stably suspended on the support base 110 as if the dynamic movement of the mass body 100 were dampened by the shock absorber 120 supported by the stationary member 140 in FIG. 7.

SUMMARY OF THE INVENTION

Notwithstanding the reality that the spring 130 must be provided between the mass body 100 and the support base 110 as shown in FIG. 6 or 7 to support the mass body 100 on the support base 110 against the gravity apart from the dynamic balancing of the mass body, it is the idea of the present invention to remove the spring 130 from a position between the mass body 100 and the support base 110 to mount it between the mass body 100 and the overhead stationary member 140, so that the mass body 100 is completely isolated from the support base 110, as shown in FIG. 8. When the support base 110 is a source of the oscillation of the system as in the case of the vehicle wherein the vehicle wheel is irregularly or vibrationally excited upward by a convex on the road surface, if the mass body 100 is completely disengaged from the support base 110, the mass body 100, or a vehicle body, will be more effectively stabilized in spite of any irregular up and down exciting movement of the vehicle wheel, although it is of course only for an imaginary and dynamic-analysis of motion that the vehicle body is completely disengaged from the vehicle wheel, because the vehicle body is totally supported on the vehicle wheel and no such overhead stationary member is available for supporting the upper ends of the shock absorber and the spring means which are connected to the vehicle body at the lower ends thereof.

Based upon such an idea, it is the object of the present invention to provide a suspension control system for a suspension particularly useful in the suspension of the automobile that is equivalent to the system shown in FIG. 8.

According to the present invention, the above-mentioned object is accomplished by a suspension control system for a suspension for supporting a mass body on a support base via a parallel combination of a spring means having a variable spring coefficient and a shock absorber having a variable damp coefficient, comprising:

a means for obtaining absolute displacement ($Z$) of the mass body along a moving path of expansion and contraction of the spring means and the shock absorber;

a means for obtaining absolute velocity (Z) of the mass body along the moving path;

a means for obtaining relative displacement (Y) of the mass body in reference to the support base along the moving path;

a means for obtaining relative velocity (Y) of the mass body in reference to the support base along the moving path; and a means for controlling the damp coefficient of the shock absorber according to a ratio of the absolute velocity to the relative velocity (Z/Y) so as to be substantially proportional thereto, and also controlling the spring coefficient of the spring means according to a ratio of the absolute displacement to the relative displacement (Z/Y) so as to be substantially proportional thereto.

The dynamic system shown in FIG. 8 is expressed by $$MZ = -C^*Z - K^*Z \qquad (3)$$

wherein $C^*$ and $K^*$ are a constant damp coefficient of the shock absorber 120 and a constant spring coefficient of the spring 130 in FIG. 8, respectively. Therefore, as will be understood from the comparison of equations (1) and (3), if the damp coefficient C of the shock absorber 120 and the spring constant K of the spring 130 in the dynamic system of FIG. 6 are controlled according to the ratio of the absolute velocity of the mass body to the relative velocity of the mass body in reference to the support base (Z/Y) and the ratio of the absolute displacement of the mass body to the relative displacement of the mass body in reference to the support base (Z/Y) so as to vary as $C^*Z/Y$ and $K^*Z/Y$, respectively, the dynamic system of FIG. 6 operates as if it were the dynamic system of FIG. 8.

When the above-mentioned suspension control system is applied to a vehicle, said mass body is a body of the vehicle, and said support base is a vehicle wheel, wherein the vehicle body is virtually isolated from the vehicle wheel with respect to the dynamic performance thereof.

The absolute velocity of the mass body may be obtained from a time-based integration of the acceleration of the mass body along the moving path detected by an acceleration sensor, and the absolute displacement of the mass body may be obtained by a further time-based integration of the absolute velocity obtained from the time-based integration of the acceleration detected by the acceleration sensor.

The relative displacement of the mass body in reference to the support base may be obtained by a stroke sensor connected between the mass body and the support base or incorporated in the shock absorber to detect the displacement of its relatively shiftable members such as a cylinder and a piston, and the relative velocity of the mass body in reference to the support base may be obtained by a time-based differentiation of the relative displacement detected by the stroke sensor.

The relative displacement obtained by the stroke sensor should desirably be modified not to be less than a predetermined non-zero value in the absolute amount thereof for use in the calculation of the ratio of the absolute displacement to the relative displacement.

The relative velocity obtained by the time-based differentiation of the relative displacement of the mass body obtained by the stroke sensor should desirably be modified not to be less than a predetermined non-zero value in the absolute amount thereof for use in the calculation of the ratio of the absolute velocity to the relative velocity.

BRIEF DESCRIPTION OF THE DRAWINGS

In the accompanying drawings.

DESCRIPTION OF THE PREFERRED EMBODIMENTS

Figure 1:
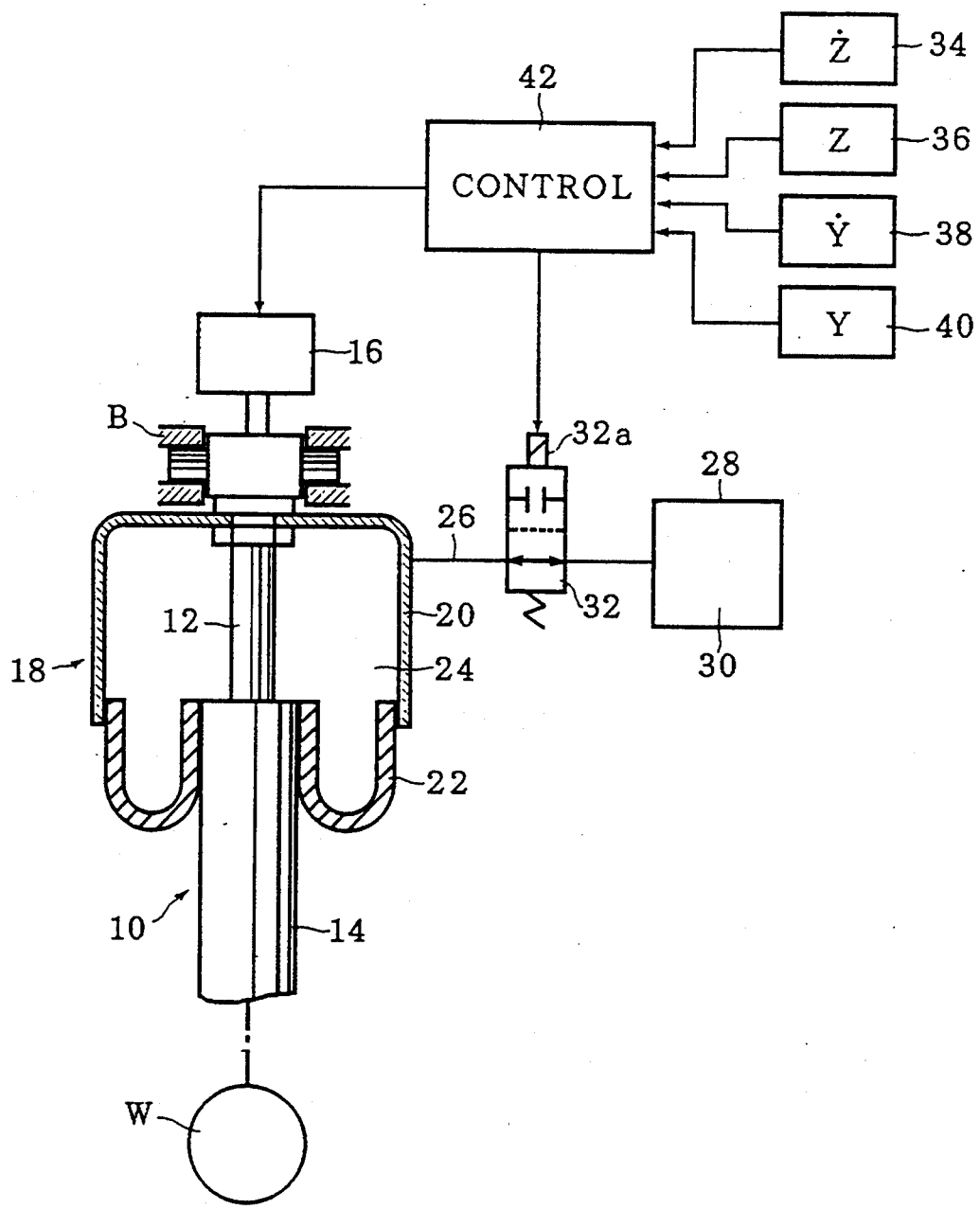
FIG. 1 is a partially diagrammatical illustration of an embodiment of the suspension control system according to the present invention.

Referring to FIG. 1 showing an embodiment of the suspension control system according to the present invention, the suspension comprises a shock absorber 10 having a piston member 12 and a cylinder member 14 and an air spring 18 including a cup member 20 and a diaphragm member 22 providing an air spring chamber 24. The upper end of the piston member 12 and the cup member 20 are pivotably mounted to a part of a vehicle body designated by B, whereas a movable end of the diaphragm member 22 is mounted to the upper end of the cylinder member 14 which is connected to a vehicle wheel W at the lower end thereof, so that the shock absorber 10 and the air spring 18 are mounted in parallel between the vehicle body and the vehicle wheel.

The damp coefficient of the shock absorber 10 is variably controlled by an actuator 16. Shock absorbers or dampers having a variable damp coefficient are known in various constructions. The above-mentioned Japanese publications also show a detailed construction of such a variable damper. Therefore, further detailed description of the construction of the shock absorber 10 will be omitted, except that the damp coefficient of the shock absorber 10 is controlled to vary by the actuator 16. The spring coefficient of the air spring 18 is controlled to vary in two values in the shown embodiment according to whether the air chamber 24 is connected with an auxiliary air chamber 30 of an auxiliary tank 28 through a passage 26 including a solenoid valve 32 actuated by a solenoid 32a or disconnected from the air chamber 30 by the solenoid valve 32. In other words, when the solenoid valve 32 is open to communicate the air chamber 24 with the auxiliary air chamber 30, the air spring 18 operates at a low spring coefficient so as to provide a low spring control, whereas when the solenoid valve 32 is closed to interrupt the passage 26, the air spring 18 operates at a high spring coefficient so as to provide a high spring control.

The actuator 16 and the solenoid valve 32 are controlled by a control means 42 described in detail hereinunder. The control means 42 receives control signals regarding absolute velocity Z of the vehicle body at a portion thereof corresponding to the shock absorber 10 and the air spring 18 (the same hereinunder) from a means 34 which obtains it as described hereinunder, absolute displacement Z of the vehicle body from a means 36 which obtains it as also described hereinunder, relative velocity Y of the vehicle body in reference to the vehicle wheel from a means 38 which obtains it as also described hereinunder, and relative displacement of the vehicle body in reference to the vehicle wheel from a means 40 which obtains it as also described hereinunder.

Figure 2:
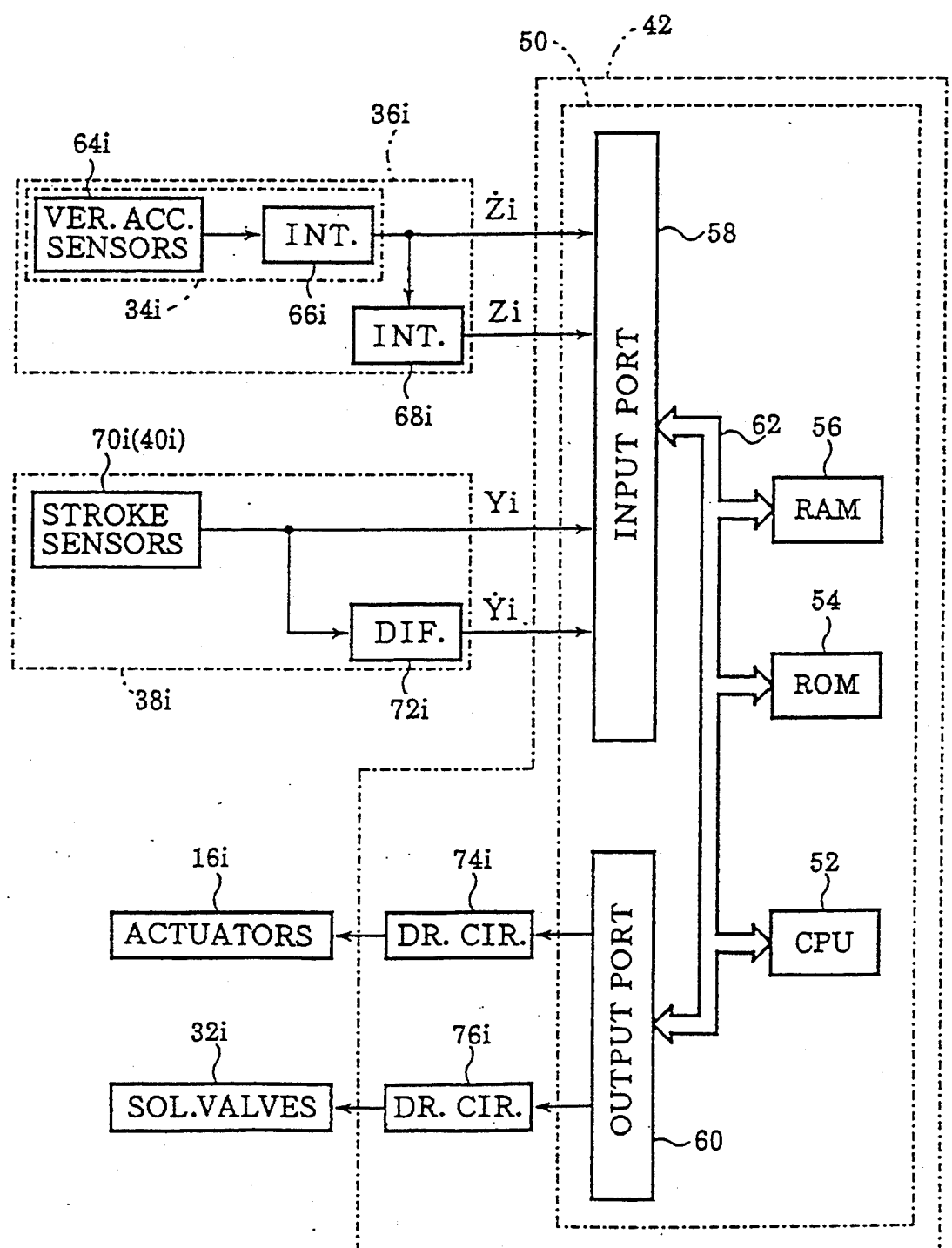
FIG. 2 is a block diaphragm showing an embodiment of the signal processing system incorporated in the suspension control system according to the present invention.

FIG. 2 shows in the form of a system diagram an embodiment of a combination of the control means 42 and the means 34–40 for obtaining the respective control signals. In FIG. 2, the portions corresponding to those shown in FIG. 1 are designated by the same reference numerals with, however, suffix "i", expressing that those means are provided for each suspension at each vehicle wheel of a vehicle. The control means 42 comprises a micro computer 50 which may be of a common type well known in the art, including a central processing unit (CPU) 52, a read only memory (ROM) 54, a random access memory (RAM) 56, an input port means 58, an output port means 60 and a bi-directional common bus 62.

64, more precisely 64$i$, wherein i may be 1, 2, 3 and 4 in the case of a four wheel vehicle, designates a vertical acceleration sensor which detects the acceleration acting in the vehicle body, more precisely a part of the vehicle body representing a share of mass to be suspended by each suspension. The vertical acceleration detected by the vertical acceleration sensor 64 is integrated on a time base in an integrator 66, more precisely 66$i$, to generate absolute velocity Z, more precisely Zi, of the corresponding part of the vehicle body. The absolute velocity Z is further integrated on a time base in an integrator 68, more precisely 68$i$, to generate absolute displacement Z, more precisely Zi, of the corresponding part of the vehicle body. The absolute velocity Z and the absolute displacement Z are both supplied to the micro computer 50 through the input port means 58. Therefore, the combination of the, vertical acceleration sensor 64 and the integrator 66 corresponds to the, means 34 in FIG. 1, and the combination of the vertical acceleration sensor 64, the integrator 66 and the integrator 68 corresponds to the means 36 in FIG. 1.

70, more precisely 70$i$, is a stroke sensor which detects the relative displacement of the vehicle body at a portion thereof corresponding to each suspension in reference to the corresponding vehicle wheel. This relative displacement is the same as the stroking displacement of the shock absorber 10. Although not shown in the mechanical construction, the stroke sensor 70 may be of any conventional type which detects the relative displacement between the piston member 12 and the cylinder member 14 of the shock absorber 10. The relative displacement Y, more precisely Yi, detected by the stroke sensor 70 is differentiated in a differentiator 72, more precisely 72$i$, on a time base to generate relative velocity Y, more precisely Yi, of the vehicle body at the part thereof corresponding to each suspension in reference to the corresponding vehicle wheel. The relative displacement Y and the relative velocity Y thus obtained are both supplied to the micro computer 50 through the input port means 58. Therefore, the stroke sensor 70 corresponds to the means 40 in FIG. 1, and the combination of the stroke sensor 70 and the differentiator 72 corresponds to the means 38 in FIG. 1.

The micro computer 50 carries out certain calculations by CPU 52 and RAM 56 according to certain programs stored in ROM 54 based upon the signals representing Z, Z, Y and Y to generate control signals for operating the actuator 16, more precisely 16$i$, through a drive circuit 74, more precisely 74$i$, and the solenoid valves 32, more precisely 32$i$, through a drive circuit 76, more precisely 76$i$.

Figure 3:
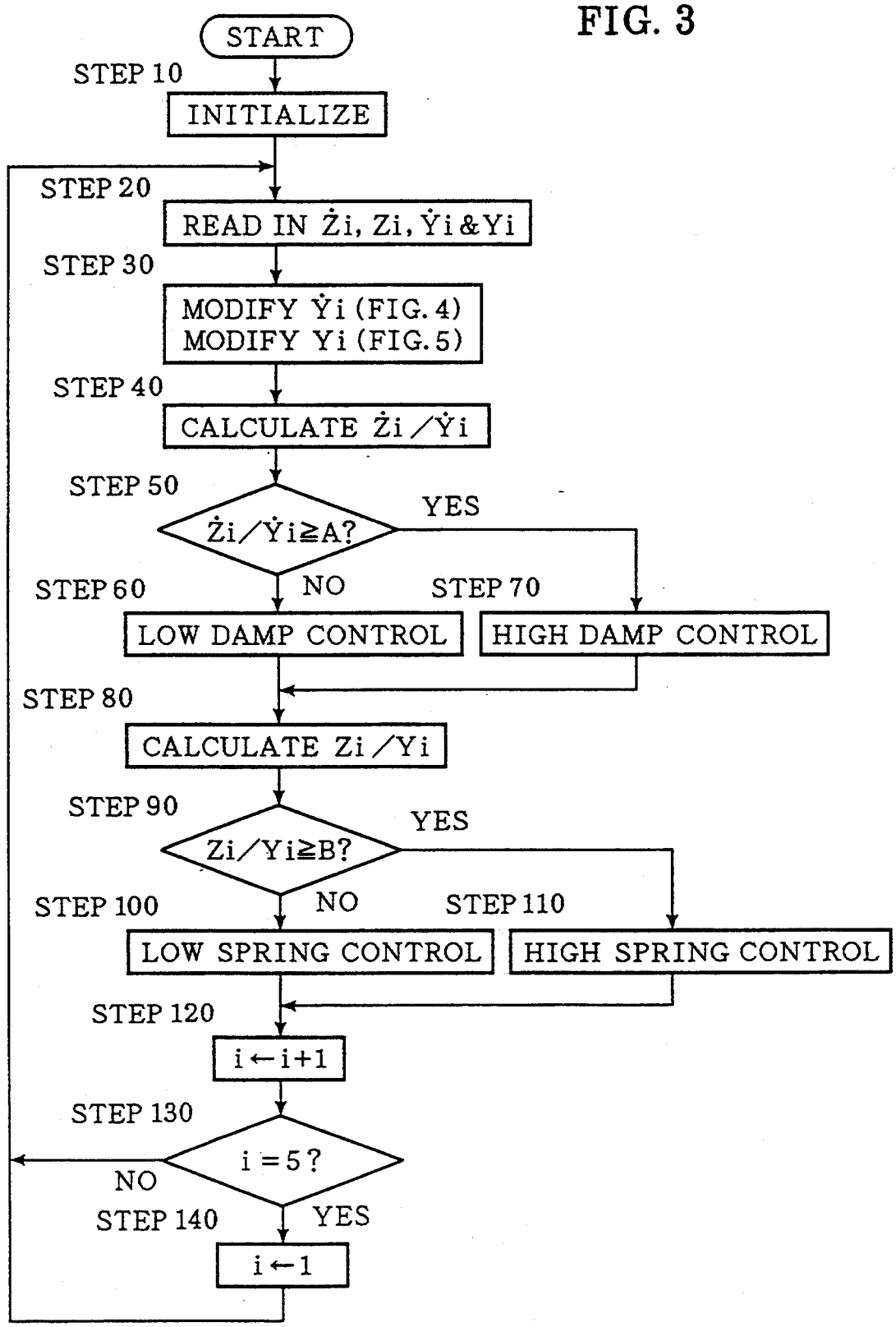
FIG. 3 is a flowchart showing an embodiment of the control operation carried out by the suspension control system according to the present invention.

Such a control operation of the micro computer 50 is shown in the form of a flowchart in FIG. 3. When the control operation is started, in step 10 all data remaining in RAM 56, etc. are initialized. The suffix "i" is set to 1. Then the control process proceeds to step 20.

In step 20, the data with regard to Z, Z, Y and Y are obtained and read in according to the manner described with reference to FIG. 2. Then the control process proceeds to step 30.

Figure 4:
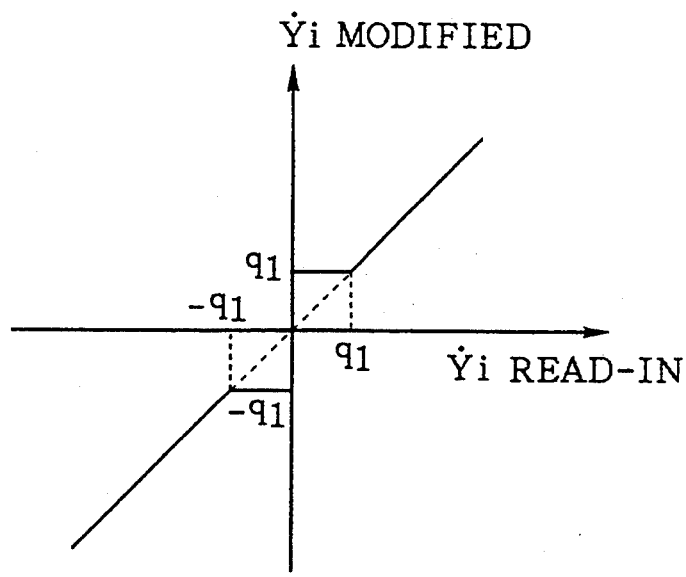
FIG. 4 is a graph showing an embodiment of the modification of the relative velocity of the mass body carried out in step 30 of FIG. 3.
Figure 5:
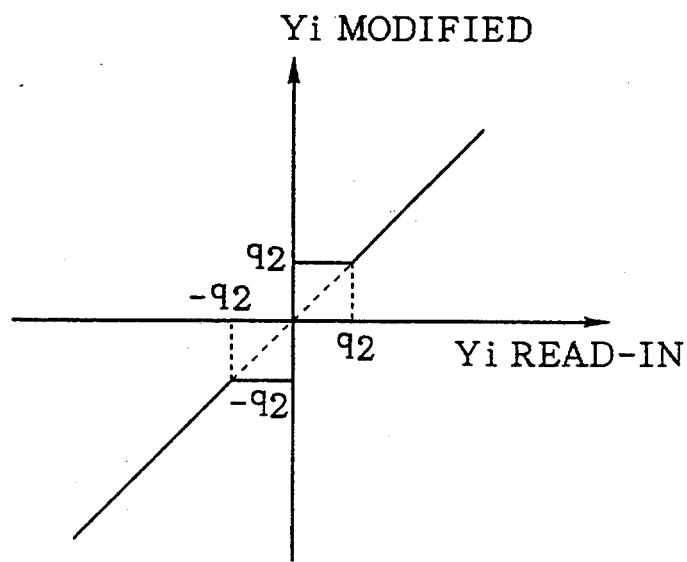
FIG. 5 is a graph showing an embodiment of the modification of the relative displacement of the mass body carried out in step 30 of FIG. 3.

In step 30, the relative velocity Y and the relative displacement Y read in from the differentiator 72 and the stroke sensor 70, respectively, are modified according to the maps shown in FIGS. 4 and 5, in order to avoid that a calculation to divide a finite amount by zero occurs in the process of calculation described hereinunder. In other words, when the read-in relative velocity Y is zero or greater than zero but smaller than $q_1$, the relative velocity Y for use in the following control process is modified to $q_1$, while when the read-in relative velocity Y is smaller than zero but greater than $-q_1$, the relative velocity Y for use in the following control process is modified to $-q_1$. Similarly, when the read-in relative displacement Y is zero or greater than zero but smaller than $q_2$, the relative displacement Y for use in the following control process is modified to $q_2$, while when the read-in relative displacement Y is smaller than zero but greater than $-q_2$, the relative displacement Y for use in the following control process is modified to $-q_2$. Then the control process proceeds to step 40.

In step 40, Z/Y, i.e. the ratio of the absolute velocity of the vehicle body to the relative velocity of the vehicle body in reference to the vehicle wheel, is calculated. Then the control process proceeds to step 50.

In step 50, it is tested if the ratio Z/Y is equal to or greater than a predetermined value A. If the answer is "no", the control process proceeds to step 60, whereas if the answer is "yes", the control process proceeds to step 70.

In step 60, the shock absorber 10 is set to a low damp operation by its damp coefficient being set to a relatively low value. In step 70, the shock absorber 10 is set to a high damp operation by its damp coefficient being set to a relatively high value. After either step, the control process proceeds to step 80.

In step 80, Z/Y, i.e. the ratio of the absolute displacement of the vehicle body to the relative displacement of the vehicle body in reference to the vehicle wheel, is calculated. Then the control process proceeds to step 90.

In step 90, it is tested if the ratio Z/Y is equal to or greater than a predetermined value B. If the answer is "no", the control process proceeds to step 100, whereas if the answer is "yes", the control process proceeds to step 110.

In step 100, the air spring 18 is set to a low spring operation by its spring coefficient being set to a relatively low value. In step 110, the air spring 18 is set to a high spring operation by its spring coefficient being set to a relatively high value. After either step, the control process proceeds to step 120.

In step 120, the suffix "i" is increased by an increment, and then in step 130 it is tested if "i" is equal to 5. If the answer is "no", the control process returns to the step 20 so that the control steps 20–100 are carried out similarly for the control of the second suspension. If the answer in step 130 is "yes", the control process proceeds to step 140, and the suffix "i" is returned to 1, so that the control steps 20–100 are carried out again for the first suspension.

Figure 6:
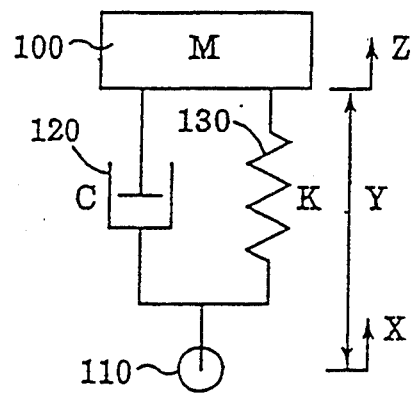
FIG. 6 is a schematic illustration of a common prior art suspension of a vehicle.
Figure 7:
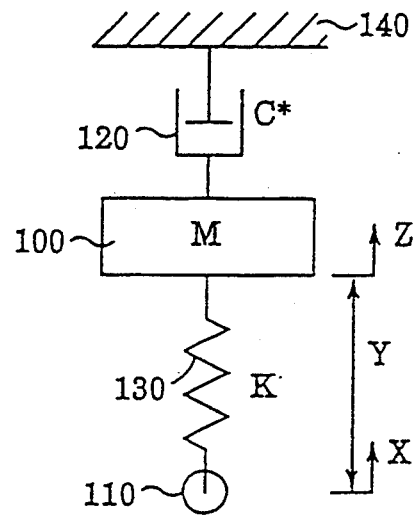
FIG. 7 is a schematic illustration of a prior art suspension incorporating a sky hook damper.
Figure 8:
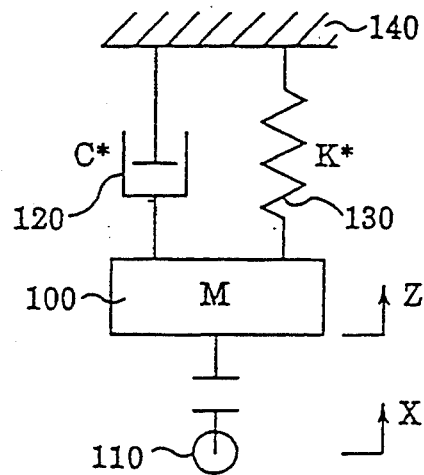
FIG. 8 is a schematic illustration of the sky hook equivalency of the suspension control system according to the present invention.

Although the damp coefficient of the shock absorber 10 is varied to take either a low value or a high value according to whether or not the ratio Z/Y is equal to or greater than A in the above-described embodiment, the damp coefficient may of course be varied to take more different values according to the magnitude of Z/Y or to vary continuously according to the magnitude of Z/Y so that more faithful equivalency conversion of the system shown in FIG. 8 to the system shown in FIG. 6 is available.

Similarly, although the spring coefficient of the air spring 18 is varied to take either a low value or a high value according to whether or not the ratio Z/Y is equal to or greater than B in the above-described embodiment, the spring coefficient may of course be varied to take more different values according to the magnitude of Z/Y or to vary continuously according to the magnitude of Z/Y so that even more faithful equivalency conversion of the system shown in FIG. 8 to the system shown in FIG. 6 is available.

Although the invention has been described in detail with reference to a particular embodiment thereof, it will be understood by those skilled in the art that various changes and/or omissions are possible with respect to the shown embodiment without departing from the scope of the present invention.

I claim:

1. A suspension control system for a suspension for supporting a vehicle body on a vehicle wheel via a parallel combination of a spring means having a variable spring coefficient and a shock absorber having a variable damp coefficient, comprising:

means for obtaining absolute displacement (Z) of said vehicle body along a moving path of expansion and contraction of said spring means and said shock absorber;

means for obtaining absolute velocity (Z) of said vehicle body along said moving path;

means for obtaining relative displacement (Y) of said vehicle body in reference to said vehicle wheel along said moving path;

means for obtaining relative velocity (Y) of said vehicle body in reference to said vehicle wheel along said moving path; and means for controlling said variable damp coefficient of said shock absorber according to a first ratio of said absolute velocity to said relative velocity (Z/Y) so as to be substantially proportional thereto, and also for controlling said variable spring coefficient of said spring means according to a second ratio of said absolute displacement to said relative displacement (Z/Y) so as to be substantially proportional thereto.

2. A suspension control system according to claim 1, wherein said absolute velocity of said vehicle body is obtained from a first time-based integration of an acceleration of said vehicle body along said moving path detected by an acceleration sensor, and said absolute displacement of said vehicle body is obtained by a second time-based integration of said absolute velocity obtained from said time-based integration of said acceleration detected by said acceleration sensor.

3. A suspension control system according to claim 1, wherein said relative displacement of said vehicle body in reference to said vehicle wheel is obtained by a stroke sensor, and said relative velocity of said vehicle body in reference to said vehicle wheel is obtained by a time-based differentiation of said relative displacement detected by said stroke sensor.

4. A suspension control system according to claim 3, wherein said relative displacement obtained by said stroke sensor is modified not to be less than a predetermined non-zero value in an absolute amount thereof for use in a calculation of said second ratio of said absolute displacement to said relative displacement.

5. A suspension control system according to claim 3, wherein said relative velocity obtained by said time-based differentiation of said relative displacement of said vehicle body obtained by said stroke sensor is modified not to be less than a predetermined non-zero value in an absolute amount thereof for use in a calculation of said first ratio of said absolute velocity to said relative velocity.

* * * * *